B. BATES.
Air and Gas, or Fluid Regulator.

No. 167,212.  
Patented Aug. 31, 1875.

Witnesses:  
F. E. Bates  
F. Wilhelm

Inventor:  
Benjamin Bates  
by  
C. H. Slicer  
his Attorney

UNITED STATES PATENT OFFICE.

BENJAMIN BATES, OF BALTIMORE, MARYLAND.

IMPROVEMENT IN AIR AND GAS OR FLUID REGULATORS.

Specification forming part of Letters Patent No. 167,212, dated August 31, 1875; application filed July 12, 1875.

*To all whom it may concern:*

Be it known that I, BENJAMIN BATES, of Baltimore city, in the State of Maryland, have invented certain new and useful Improvements in Air and Gas or Fluid Regulators; and I do hereby declare that the following is a full, clear, and exact description thereof, which will enable others skilled in the art to which it pertains to make and use the same, reference being had to the accompanying drawing, and to the letters of reference marked thereon, which form a part of this specification.

When the pressure of gas in storage or gas-generating tanks in mineral-water, champagne, beer, and such like bottling establishments, is in excess of the amount required in the process of mixing and bottling said fluids, the bottles are either burst and destroyed by the excessive pressure, or the material is greatly wasted by the necessary chucking of the bottles in order to fill them. It also happens that this excessive pressure causes the water in the washer upon the mixing-tank to mingle with the vitriol in the vitriol-chamber of the gas-generating tank, creating heat, and otherwise damaging and interrupting the bottling process.

In order, therefore, to bottle such fluids with safety, and in a quick and economical manner, it is necessary to regulate the amount of pressure, and to preserve a uniform flow of gas from the generator or storage tank to the mixing or bottling tank. This has been hitherto attempted, but imperfectly, and by insufficient means.

My invention particularly relates to means for operating the valve to regulate the pressure of gas without stopping the flow, and for automatically closing the valve and stopping the flow from the inlet-chamber into the outlet-chamber in case of accident to the diaphragm of the regulator, which means will be hereinafter specifically pointed out and claimed.

The regulator is not only adapted for use in bottling-establishments, but may be used to regulate the pressure of air, illuminating-gas, or any fluid.

Figure 1:
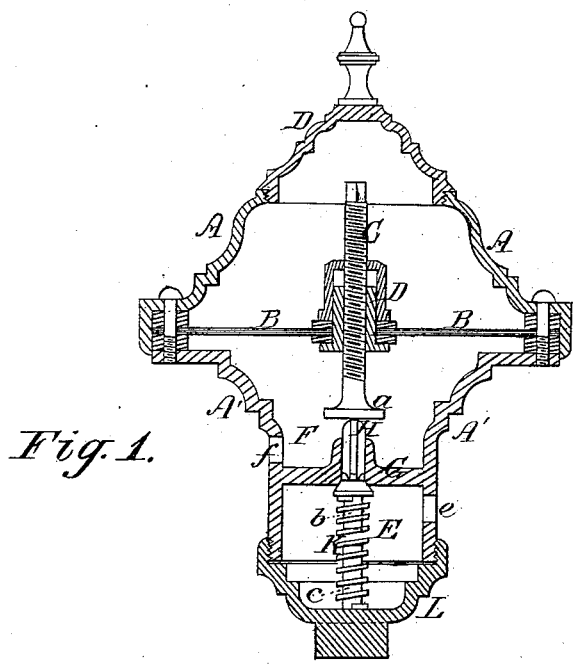
Figure 2:
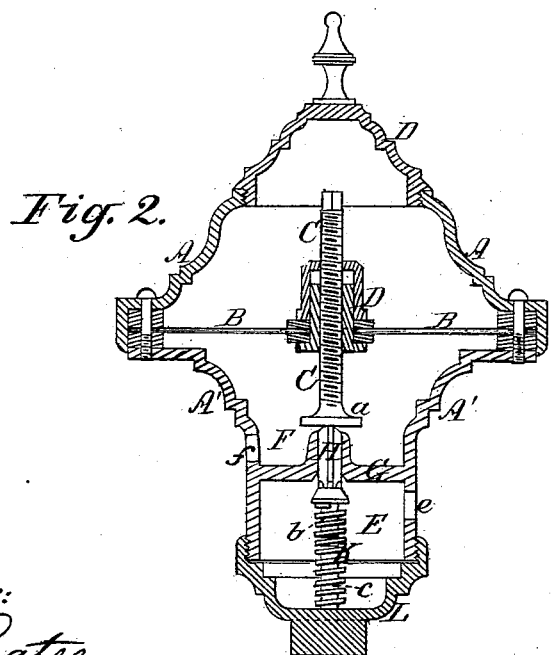

In the accompanying drawing, Figure 1 represents a vertical section of a gas-regulator embracing my invention, with the valve closed, and Fig. 2 a similar view with the valve open.

The case of the regulator is somewhat in the shape of an urn, and is primarily composed of two parts, A and A', divided by the usual diaphragm B, flexible or metallic, and united by a flanged connection and bolts passing through the parts, diaphragm, and air-tight gaskets. The operating-screw C passes through an ordinary stuffing-box and holder, D, with gum rings, to render them air-tight, as is usual, and is provided with an enlarged hammer-head, $a$, which strikes the valve, as will be presently described. This operating-screw C is manipulated to press down the valve the requisite distance to admit any desired flow and pressure into the outlet-chamber. The upper of the two portions of the case A is provided with a screw-cap, D, which, when it is necessary to lower the valve to admit a greater flow of the fluid, one may remove, and have access to, and adjust the operating-screw C without cutting off the flow into the inlet and removing said upper portion. This is of great importance, as it does not interrupt the continuous flow of the fluid, but obviates the necessity of suddenly stopping the flow of gas from the storage tank or main, as the case may be. The lower one, A', of the two portions of the case is subdivided into an inlet-chamber, E, having an inlet-opening, $e$, and an outlet-chamber, F, having an outlet-opening, $f$, and through an opening in the division-wall G, between said chambers, passes a headed valve, H, fitting closely to the valve-seat when closed. This valve H, in the example shown, is a cylindrical four-wayed valve, having a short stem, $b$, which is embraced by a spiral spring, K, supported by a post, $c$, rising from the bottom of the case. This spring K forms a cushion for the valve H, and when the pressure of the screw C is removed automatically closes said valve.

The bottom L of the case which carries the spring K is made separate from the lower part A' of the case, to admit of removing the valve, if necessary, to repair and cleanse it, without unfastening the connections of the main portions A A' of the case at the diaphragm.

The diaphragm itself may be removed and repaired, if necessary, without a cessation of the flow into the inlet-chamber.

In fact, as will be seen from the above description, all parts of the regulating mechanism may be removed and repaired or cleansed separately without disturbing the regulator as a whole, and particularly may the adjusting-screw C be manipulated to raise and lower the valve H, to admit more or less air or fluid pressure by removing the cap D, and without disturbing the continuous flow.

Another important advantage of my invention is that, as described, the operating stem or screw C does not carry the valve, as in other regulators, but is made separate, and with a broad head, $a$, so that no matter at what angle (possible from the construction) it strikes the valve, it will drive it down straight, and without binding it against its seat, as would happen in the careless adjustment of a rigid stem carrying the valve.

It will be observed that the under valve stem $b$ acts as an extension of the fixed post $c$ in its capacity to hold the spring in its central position, but the post and stem are separate, in order to allow of the adjustment of the valve, and to maintain the spring always in position to automatically close, when from any cause, the screw-stem C is released from pressing on the valve.

A distinguishing features of my invention lies in the separation of the valve from its adjusting-stem, while maintaining its pressure contact at their point of junction. This contacting-point is made by the under flat surface of the head or disk $a$, and the rounded end of the valve passing through the division G, whereby the contact of the valve and its adjusting-screw stem is limited to an axial point, and the valve prevented from receiving any lateral pressure.

The following is claimed as new in an air or gas regulator, viz:

1. In an air or gas regulator, the combination of the adjusting-screw stem C, the valve H, and spiral spring K, whereby said valve is raised and lowered to regulate the flow from the inlet to the outlet, and preserve a uniform pressure, substantially as described.

2. The combination, in a pressure-regulator, of a pivotal bearing-point of the valve H, and a flat bearing of the adjusting-stem, whereby the bearing of the valve is made coincident with its axis, and all lateral binding thereof prevented, substantially as herein set forth.

3. The combination, in a pressure-regulator, in which the valve and its adjusting-stem have a pivotal point of contact of the central post $c$, the under valve-stem $b$, and the valve-spring K, substantially as and for the purpose as herein set forth.

In testimony that I claim the foregoing I have affixed my signature in presence of two witnesses.

BENJAMIN BATES.

Witnesses:
  A. H. SLIVER,
  F. E. BATES.